(12) United States Patent
Carpenter et al.

(10) Patent No.: US 11,407,597 B2
(45) Date of Patent: Aug. 9, 2022

(54) SYSTEM AND METHOD FOR PROCESSING IRREGULAR PARCELS

(71) Applicant: Siemens Logistics LLC, DFW Airport, TX (US)

(72) Inventors: Michael D. Carpenter, Arlington, TX (US); Francisco Grupp, Trophy Club, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 533 days.

(21) Appl. No.: 16/568,810

(22) Filed: Sep. 12, 2019

(65) Prior Publication Data
US 2020/0102153 A1    Apr. 2, 2020

Related U.S. Application Data

(60) Provisional application No. 62/737,148, filed on Sep. 27, 2018.

(51) Int. Cl.
*B65G 47/46* (2006.01)
*B65G 47/34* (2006.01)
*B62B 11/00* (2006.01)

(52) U.S. Cl.
CPC ...... *B65G 47/46* (2013.01); *B65G 2201/0285* (2013.01); *B65G 2203/044* (2013.01)

(58) Field of Classification Search
CPC ............... B65G 47/34; B65G 47/46; B65G 2201/0285; B65G 2203/044; B62B 11/00
USPC ........................................ 700/218, 228, 230
See application file for complete search history.

(56) References Cited

U.S. PATENT DOCUMENTS

| | | | | |
|---|---|---|---|---|
| 6,240,335 | B1 * | 5/2001 | Wehrung | G05B 19/4189 198/577 |
| 7,402,018 | B2 * | 7/2008 | Mountz | B60P 1/64 280/47.35 |
| 7,516,848 | B1 * | 4/2009 | Shakes | B07C 5/38 271/223 |
| 7,686,171 | B1 * | 3/2010 | Shakes | B07C 7/005 209/583 |
| 7,850,413 | B2 * | 12/2010 | Fontana | B66F 3/08 414/331.14 |
| 8,831,984 | B2 * | 9/2014 | Hoffman | G08G 1/096708 705/28 |
| 9,008,825 | B2 * | 4/2015 | Benjamin | B65G 47/04 700/229 |
| 9,008,830 | B2 * | 4/2015 | Worsley | G05D 1/0291 700/216 |
| 9,262,741 | B1 * | 2/2016 | Williams | G06Q 30/0635 |
| 9,330,373 | B2 * | 5/2016 | Mountz | G06Q 10/087 |
| 9,792,577 | B2 * | 10/2017 | Mountz | G06Q 10/087 |
| 10,217,074 | B1 * | 2/2019 | Stallman | G06Q 50/28 |
| 10,793,369 | B2 * | 10/2020 | Sekich | B65G 43/08 |

(Continued)

*Primary Examiner* — Douglas A Hess

(57) ABSTRACT

A system for sorting and delivering packages to one of a plurality of loading points includes a first movable cart positioned adjacent a first conveyor in a receiving position to receive packages from the first conveyor, a second movable cart positioned in a staging position, the second movable cart being empty, and a vehicle selectively engageable with the second movable cart to move the second movable cart from the staging position to the receiving position while simultaneously abutting and displacing the first movable cart from the receiving position to a transfer position.

13 Claims, 3 Drawing Sheets

(56) References Cited

U.S. PATENT DOCUMENTS

| | | | |
|---|---|---|---|
| 10,870,204 B2 * | 12/2020 | Diankov | B25J 9/1697 |
| 11,084,410 B1 * | 8/2021 | Bhaskaran | B66F 9/063 |
| 11,124,401 B1 * | 9/2021 | Jarvis | G05D 1/0234 |
| 11,136,192 B2 * | 10/2021 | Ahmann | G05D 1/0016 |
| 11,180,069 B2 * | 11/2021 | Jarvis | G05D 1/0212 |

* cited by examiner

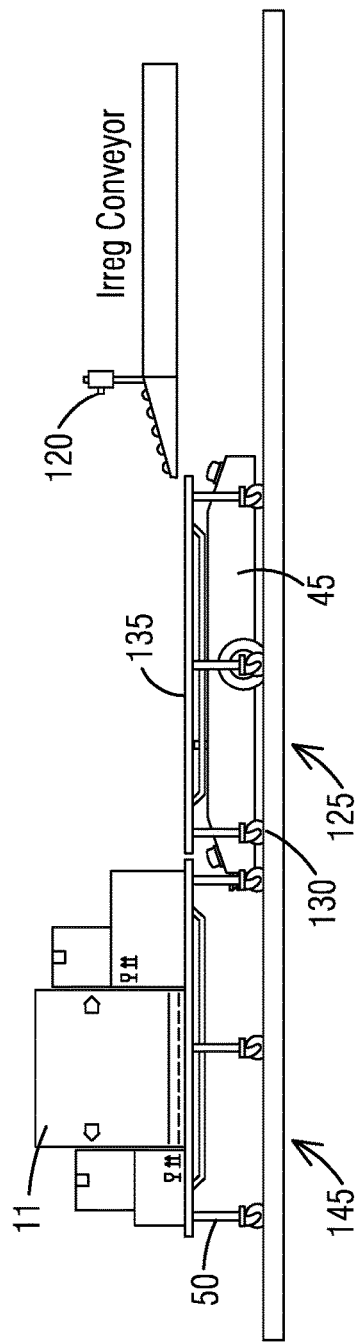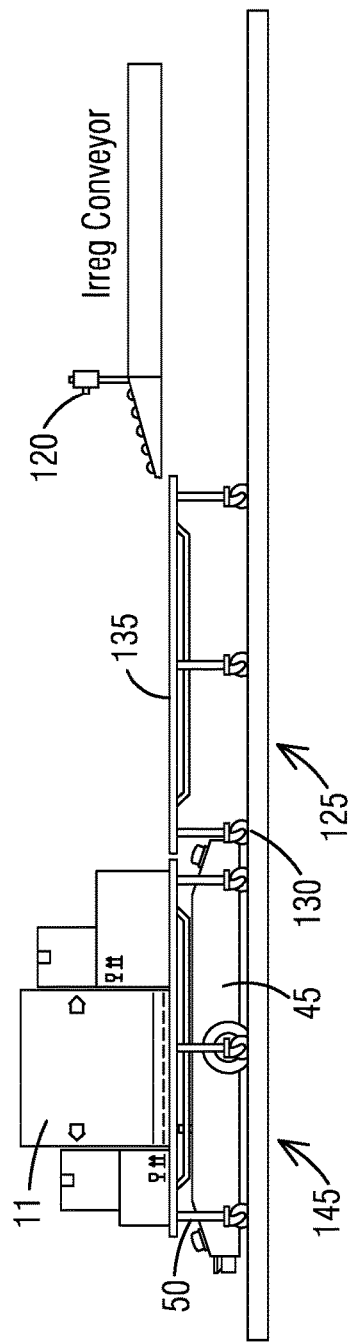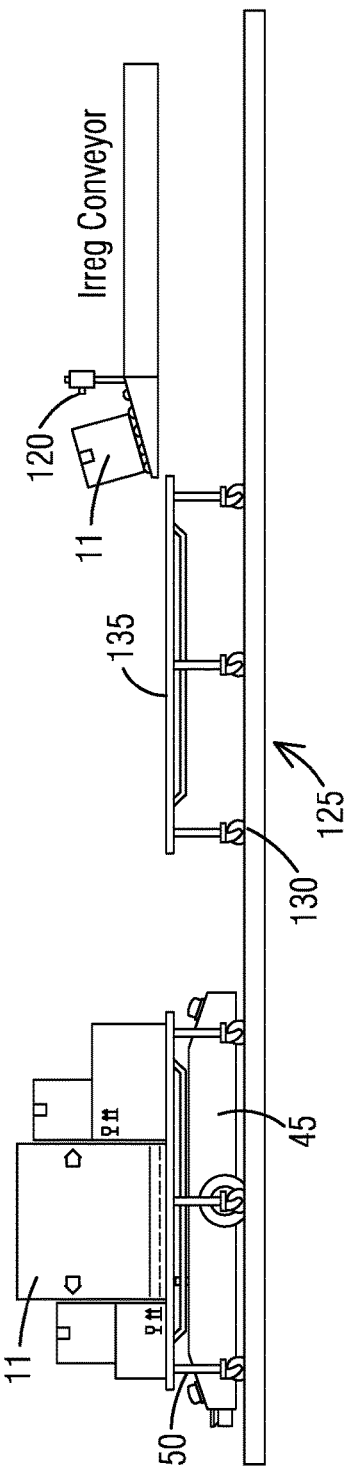

SYSTEM AND METHOD FOR PROCESSING IRREGULAR PARCELS

TECHNICAL FIELD

The present disclosure is directed, in general, to an automatic processing system for parcels and other items, and more specifically to a system and method for the automatic processing for irregular parcels and other items.

BACKGROUND

Parcel delivery services such as the United Parcel Service or the U.S. Post Office receive packages of all shapes and sizes and must handle each of these packages from the receipt of the packages to the delivery of the packages. Between the receipt and the delivery there are typically multiple instances in which sorting of the packages occurs. During each sort, items are grouped by progressively narrowing a parameter such that packages with similar parameters are grouped together. Typically, the parameter is an address where the first sort may be by country or state of destination. A subsequent sort may narrow the sort by city or town, followed by zip code or street address as may be required to deliver the package.

SUMMARY

A system for sorting and delivering packages to one of a plurality of loading points includes a first movable cart positioned adjacent a first conveyor in a receiving position to receive packages from the first conveyor, a second movable cart positioned in a staging position, the second movable cart being empty, and a vehicle selectively engageable with the second movable cart to move the second movable cart from the staging position to the receiving position while simultaneously abutting and displacing the first movable cart from the receiving position to a transfer position.

A method of sorting packages includes positioning a first movable cart in a receiving position to receive packages from a first conveyor, positioning an empty second movable cart in a staging position, and engaging the second movable cart with a vehicle to allow the vehicle to move the second movable cart into the receiving position while simultaneously abutting and displacing the first movable cart to a transfer position. The method also includes disengaging the vehicle from the second movable cart, engaging the vehicle and the first movable cart to allow the vehicle to move the first movable cart to one of a plurality of loading points, and disengaging the vehicle from the first movable cart.

A system for sorting packages from a first conveyor to a plurality of loading points includes an autonomous guided vehicle movable between the first conveyor and the plurality of loading points, a first movable cart selectively coupled to the autonomous guided vehicle and positioned by the autonomous guided vehicle in a receiving position to receive packages from the first conveyor, and a sensor operable to measure a parameter indicative of the fill state of the first movable cart, and wherein the autonomous guided vehicle connects to the first movable cart and moves the first movable cart to one of the plurality of loading points in response to the parameter being indicative of a full cart.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 6 is a schematic side view of the AGV moving the second cart from the staging position to the receiving position while simultaneously moving the first cart from the receiving position to a transfer position.

FIG. 7 is a schematic side view of the AGV engaging the first cart in the transfer position after positioning the second cart in the package receiving position.

FIG. 8 is a schematic side view of the AGV moving the first cart from the transfer position while the second cart remains in the receiving position.

Figure 1:
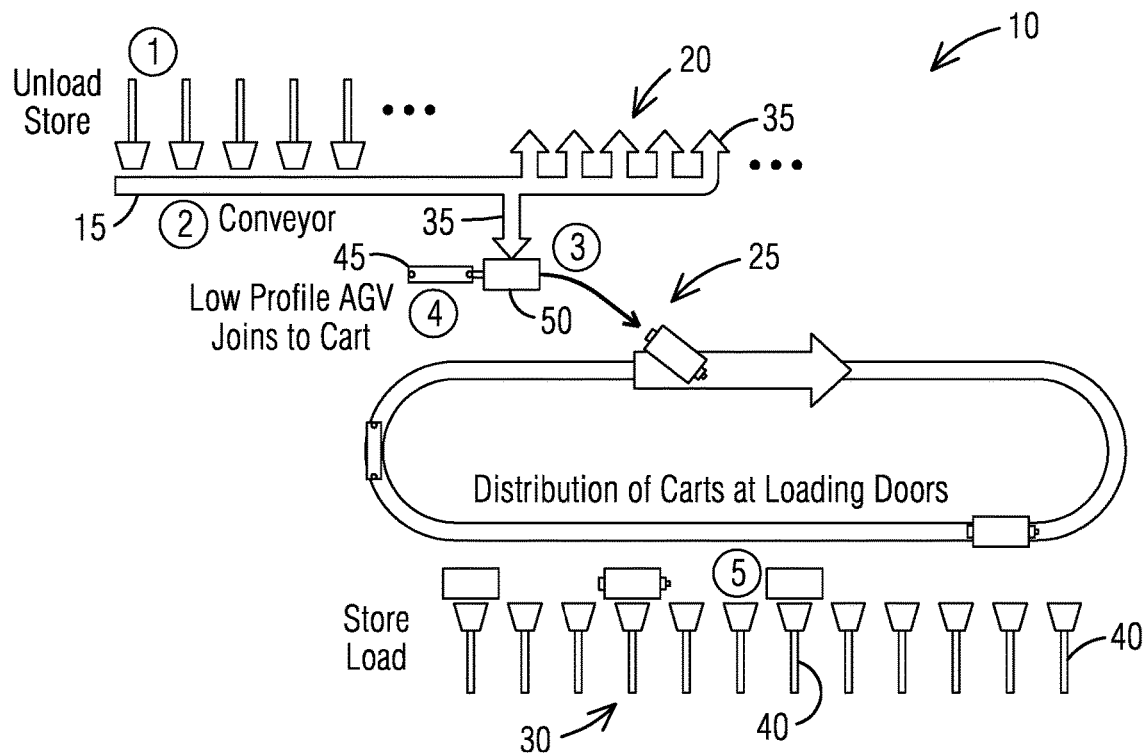
FIG. 1 is a schematic illustration of a package sorting and delivery system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

Delivery services must handle packages of differing size and weight in order to accommodate their customers. Packages or parcels are often separated into classes to allow the packages to be sorted more efficiently. In one system, packages are classified as being one of small, large, or irregular. Irregular packages are those that are too large, too heavy, or oddly shaped such that their handling is more difficult. Irregulars can be difficult to process and sort because they often cannot be automatically processed, thereby forcing manual sorting, loading, and unloading.

FIG. 1 illustrates a system 10 that is well-suited to sorting irregular packaging 11. As illustrated in FIG. 1, the system 10 includes a gathering conveyor 15, a sorting area 20, a transportation system 25, and a loading area 30.

The sorting of packages 11 begins when the packages 11 are deposited on the gathering conveyor 15. Packages 11 could be delivered to the gathering conveyor 15 from multiple sources including manually depositing the packages 11, conveyors, or delivery from trucks or other transportation sources. As discussed above, multiple sorts often occur for each package 11. Thus, at this point in the system 10, the packages 11 are unsorted. However, the packages 11 that arrive at the gathering conveyor 15 could have been sorted elsewhere, with the system 10 of FIG. 1 representing a subsequent or intermediate sort in the entire chain of sorting that is required to ultimately deliver the package 11.

The conveyor 15 moves the packages 11 toward the sorting area 20 where they can be sorted by class, by another parameter such as the address, or by both. In the construction of FIG. 1, only irregular packages 11 are loaded on the conveyor 15 such that the sort is based on a sorting parameter such as a portion of an address (e.g., a city, a zip code, a street, or the like).

The sorting area 20 includes a plurality of points or stations 35 where packages 11 are discharged to the transportation system 25. Each point or station 35 collects all the packages 11 that are destined for a location that includes a particular portion of an address. For example, each point or station 35 could represent a city in a particular region or a zip code in a particular area.

The transportation system 25 transports the sorted packages 11 from the sorting area 20 to the loading area 30. The loading area 30 often includes another transportation system such as a delivery truck or secondary conveyor system. The packages 11 are delivered to one of a plurality of load points 40 within the loading area 30 to further advance the delivery process. For example, if each point 40 represents a zip code, a further conveyor system could be employed to further sort the packages 11 down to the street address level for delivery. Alternatively, the point 40 may include a truck that delivers the packages 11 to a secondary facility for further sorting and ultimate delivery.

Figure 2:
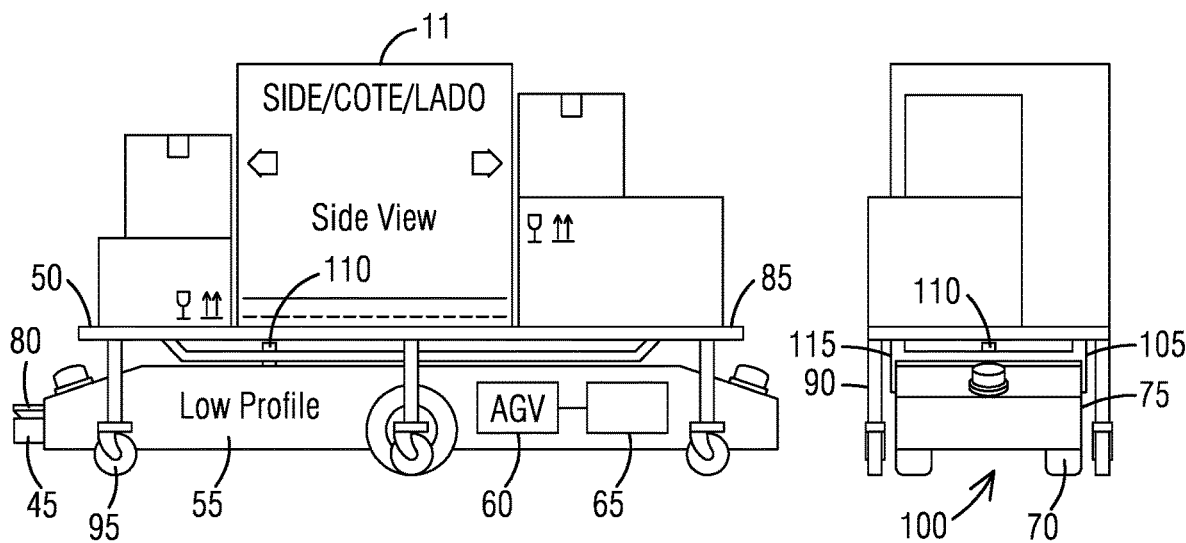
FIG. 2 is a schematic side and front view of an autonomous guided vehicle (AGV) in an engaged position with a cart supporting packages.

As illustrated in FIG. 1, the transportation system 25 includes several vehicles 45, preferably autonomous guided vehicles (AGVs) 45 that cooperate with a number of carts 50 to move the packages 11 from the sorting area 20 to the loading area 30. With reference to FIG. 2, each AGV 45 includes a body 55, a drive system 60, and a computer system 65 that operates the drive system 60 to control the speed and direction of movement of the AGV 45. In preferred constructions, the drive system 60 is electrical and includes batteries and electric motors that drive wheels 70, treads, or other floor contacting elements to allow for operation of the AGV 45 indoors.

The body 55 of each AGV 45 substantially encloses the drive system 60 and the computer system 65 and is arranged to define a low profile. The low profile of the body 55 is sized and selected to allow for the passage of the AGV 45 under one of the carts 50 as will be discussed below. The body 55 also defines a coupling portion 75 that is arranged to engage one of the carts 50 as will be discussed below.

As illustrated in FIG. 1, the AGVs 45 move along a path autonomously to deliver packages 11 to the appropriate loading points 40. While the AGVs 45 are illustrated as following a pre-determined path, one of ordinary skill would realize that AGVs 45 could move directly to the desired loading point 40 following the shortest path possible if desired. It should be clear that many different paths and arrangements could be employed as desired, or the AGVs 45 could take the shortest possible route while avoiding collisions and obstacles.

Each of the AGVs 45 may include a control system that allows it to avoid collisions with other objects or AGVs 45. In the least expensive and simplest system, the AGVs 45 are programmed to follow the fixed path with the loading points 40 all positioned on that path to receive the carts 50. Constructions that provide for point-to-point travel of the AGVs 45 are generally more efficient than systems that follow a fixed path or circuit. However, the AGVs 45 employed are generally costlier as they require more accurate and complex control systems to assure proper navigation and movement. Systems that use a fixed path can be simpler, but as the available paths become more complex, the control system must also become more complex.

Each AGV 45 can include one or more sensors (not shown) that feed data to the computer 65 to allow for autonomous movement to a desired destination without following the predefined path. Other constructions may include fewer sensors. However, these AGVs 45 would be limited to travel that follows the path or loop. Each AGV 45 also includes a communication module 80 that allows the AGV 45 to receive data or instructions from an external source.

With reference to FIG. 2, each of the carts 50 includes a package receiving portion 85, a lower frame 90 that supports the package receiving portion 85, and a plurality of wheels or castors 95 that allow for free movement of the cart 50. In the construction illustrated in FIG. 2, the package receiving portion 85 is simply a flat surface sized to receive and support the packages 11. Other constructions could include other shapes and sizes for the package receiving portion 85.

The lower frame 90 is a structural arrangement that interconnects the wheels 95 and the package receiving portion 85 and positions the package receiving portion 85 at the height desired for a particular operation. The lower frame 90 also defines a vehicle space 100 sized to allow for the passage or at least the entry of an AGV 45 or other vehicle. In the illustrated construction, the vehicle space 100 includes an elongated pocket through which the AGV 45 can pass. The lower frame 90 also defines an engagement portion 105 arranged to cooperate with the coupling portion 75 of the AGV 45 to connect the AGV 45 and the cart 50 for movement. For example, in one construction, the AGV 45 includes one or more engagement pins 110 that move vertically into an aperture or pocket formed as part of the lower frame 90. The pins 110 engage the apertures to connect the AGV 45 and the cart 50 to allow the AGV 45 to move the cart 50 to any position or orientation desired. The AGV 45 controls the extension and retraction of the pins 110 to assure that they are retracted as the AGV 45 moves under the cart 50 but then extend to complete the engagement. For example, in one arrangement the pins 110 are spring biased in an extended position where they would engage the cart 50. A solenoid or other control mechanism such as a motor driving a gear arrangement (e.g., rack and pinion) operates to retract the pin or pins to facilitate disengagement and to allow movement into the engagement position.

The connection between the cart 50 and the AGV 45 allows the AGV 45 to pass longitudinally underneath the cart 50, but also includes constraining structure that assures the proper orientation between the cart 50 and the AGV 45. In the illustrated construction, the restraining structure includes sidewalls 115 that extend from the cart 50 and engage the AGV 45 to inhibit unwanted relative movement. Using two pins 110 as described above can also serve as constraining structure as the two engaged pins will not allow unwanted relative movement between the AGV 45 and the cart 50. In some constructions, a latching mechanism in the AGV 45 locks the AGV 45 to the cart 50.

A sensor 120 positioned at each sorting point 35 or on each cart 50 can be used to measure a parameter indicative of the load on the cart 50. The sensor 120 could simply count packages 11 and provide a parameter value that indicates the cart 50 is full when a certain number is reached. In another construction, the sensor 120 could measure the weight on the cart 50 and could transmit a parameter indicative of a full cart 50 when a preselected weight is exceeded. In yet another construction, the sensor 120 measures the volume of objects on the package receiving portion 85. Sensors 120 such as visual, laser, acoustic, and the like could be employed to make this measurement. As should be clear, the type of sensor 120 employed is not critical so long as the sensor 120 is capable of transmitting a parameter that indicates the cart 50 is full.

In operation, the system 10 sorts packages 11 based on a desired sort criteria with a significantly reduced labor force when compared to prior systems. The packages 11 are first deposited on the gathering conveyor 15. The packages 11 could come from trucks or other delivery systems including other conveyors and the like. The gathering conveyor 15 conveys the packages 11 to the sorting area 20 where the packages 11 are scanned to determine a destination and then sorted by the desired criteria. A destination label could include an RFID, a barcode, or other readable component that allows the destination to be read, stored in a computer, and used for sorting. In one situation, such as a large intake facility in the United States the packages 11 may be scanned to determine a destination state or country and then sorted solely on that basis. Thus, each sort point 35 would represent a state, a group of states, a country, or a group of countries and packages 11 would be discharged from the gathering conveyor 15 at the sort point 35 that matches the state or country of their destination. In a mid-level sorting system, the packages 11 that were sorted in the previous example are further sorted based on a city or zip code. In this example, the sorted packages 11 from the first example that are destined for a single state or a group of states are placed on a gathering conveyor 15 and directed to a sorting area 20. The package destinations are again scanned but this time, each sort point 35 represents a city or a zip code rather than a state or a country. In this manner, the packages 11 can be ultimately sorted to a level where they are grouped for delivery by a single delivery vehicle.

Figure 3:
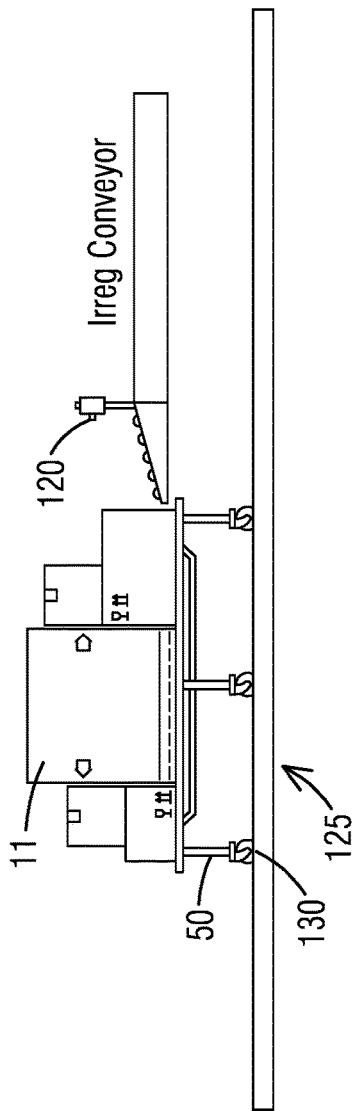
FIG. 3 is a schematic side view of the cart of FIG. 2 in a package receiving position adjacent a first conveyor.

As illustrated in FIG. 3, each package 11 is discharged from the gathering conveyor 15 at the appropriate sort point 35 and may be moved on a short discharge conveyor that moves the package 11 between the gathering conveyor 15 and the cart 50. The cart 50 is placed in a receiving position 125 where it is well-suited to receiving the packages 11 from the discharge conveyor or directly from the gathering conveyor 15. An indexing member 130 engages the cart 50 to hold the cart 50 in the receiving position 125 during the loading process. In one construction, the floor includes the indexing member 130 which includes one or more detents arranged to engage one or more wheels 95 of the cart 50 to lock the position of the cart 50 during loading. In other constructions, the indexing member 130 is attached or formed as part of the discharge conveyor or the gathering conveyor 15.

Figure 4:
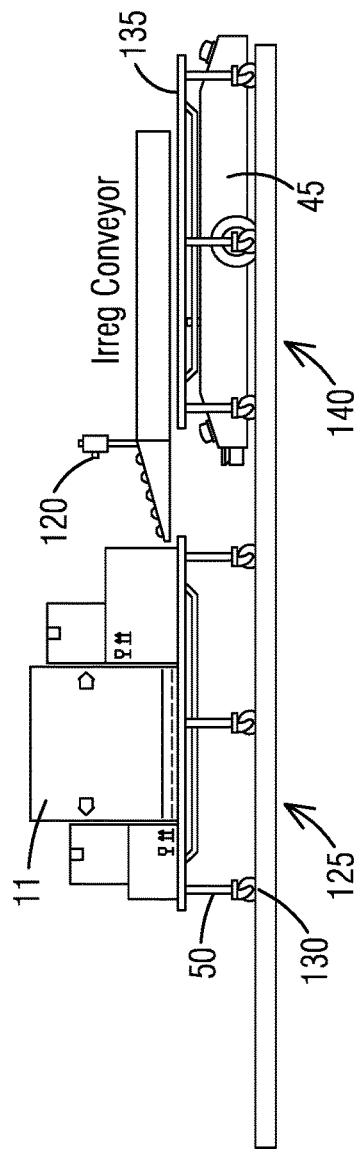
FIG. 4 is a schematic side view of the cart of FIG. 2 in the package receiving position and a second cart being position in a staging position by the AGV of FIG. 2.

During the filling process, or after the cart 50 is filled, one of the AGVs 45 positions an empty cart 135 in a staging area 140. As illustrated in FIG. 4, the staging area 140 is underneath the discharge conveyor. However, other positions are possible. To move the empty cart 135 into position, the AGV 45 first moves into an engagement position beneath the cart 135. The AGV 45 then engages the cart 50 such that movement of the AGV 45 produces a corresponding movement of the empty cart 135. The AGV 45 then moves into a staging position 140 as illustrated in FIG. 4 to place the cart 135.

The discharge conveyor includes a sensor 120 that determines the fullness of the cart 50 being filled and generates a signal indicative of the level of fullness. In one construction, the sensor 120 detects when the cart 50 reaches a predetermined fill level (e.g., 75 percent) and signals an AGV 45 to deliver an empty cart 135 to the staging area 140 in response to reaching that predetermined level. Different sorting points 35 could be set to request empty carts 135 at different levels of fullness based on the time it takes to fill a cart 50 and past experience. In still other constructions, the sensor 120 indicates when the cart 50 is full and requests an AGV 45 and an empty cart 135 only when the cart 50 being filled is filled.

It should be noted that the sensor 120 could be replaced by a manual operation. For example, an operator could determine when the cart 50 is full and press a button to request an AGV 45 and an empty cart 135. In a more sophisticated system, the operator may have two buttons at each sorting point 35 where one indicates that an empty cart 135 should be requested and placed in the staging area 140 and a second button that indicates that the cart 50 being filled is full.

Figure 5:
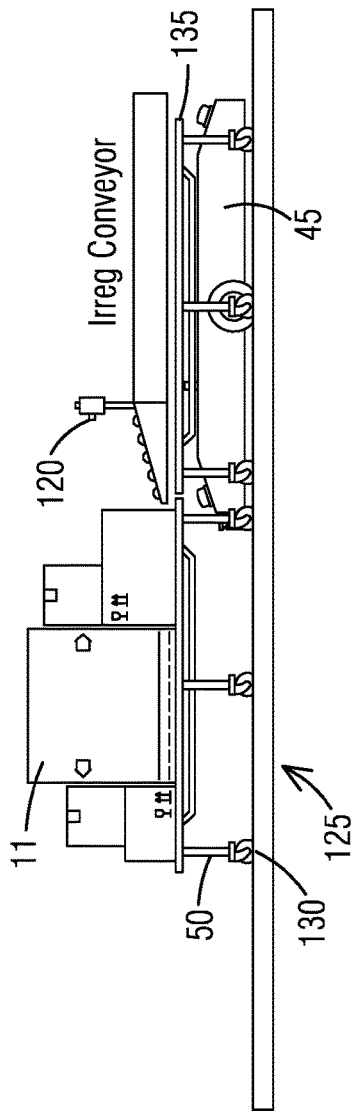
FIG. 5 is a schematic side view of the AGV moving the second cart from the staging position to the receiving position while engaging the first cart in the receiving position.

Once it is determined that the cart 50 is full, a signal is sent to one of the AGVs 35 to replace the cart 50. FIG. 5 illustrates the beginning of the replacement process. The AGV 45 first positions itself in an engagement position under the empty cart 135 and engages the empty cart 135 for movement, as illustrated in FIG. 4. The AGV 45 then moves the empty cart 135 from the staging area 140 to the receiving position 125. As the empty cart 135 moves, it abuts the full cart 50, as illustrated in FIG. 5 and pushes the full cart 50 out of the receiving position 125 and into a transfer position 145, as illustrated in FIG. 6. Thus, the single AGV 45 simultaneously moves both the empty cart 135 and the full cart 50. Once the empty cart 135 is in the receiving position 125, the AGV 45 disengages from the empty cart 135 and moves to the transfer position 145 beneath the full cart 50, as illustrated in FIG. 7. The AGV 45 then engages the full cart 50 and transports the full cart 50 to the desired loading point 40.

As discussed above, the AGV 45 connects directly to the empty cart 135 but the empty cart 135 does not "connect" to the full cart 50 as that term would be understood in the art. Rather, the full cart 50 "abuts" the empty cart 135 to allow the empty cart 135 to push the full cart 50. However, the empty cart 135 could not pull the full cart 50. The term "connect" would be understood in the art to include connections commonly used to attach multiple carts in a train configuration. The connections allow for both pulling and pushing as well as pivoting about the connection. The arrangement described above is not capable of these actions and is only capable of a pushing operation. As such, the term "abut" as used herein and in this context should include contact between two carts that allow one of the carts to push the other cart but not pull the cart.

As discussed earlier, the AGV 45 may follow a preprogrammed path that passes each of the loading points 40. The AGV 45 would then deliver the cart 50 to the proper loading point 40. In other constructions, the AGV 45 will take the shortest possible route to the desired loading point 40, while avoiding any obstacles along the way.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for sorting and delivering packages to one of a plurality of loading points, the system comprising:
   a first movable cart positioned adjacent a first conveyor in a receiving position to receive packages from the first conveyor;
   a second movable cart positioned in a staging position, the second movable cart being empty; and
   a vehicle selectively engageable with the second movable cart to move the second movable cart from the staging position to the receiving position while simultaneously abutting and displacing the first movable cart from the receiving position to a transfer position.

2. The system of claim 1, wherein the receiving position includes an indexing member that engages the first movable cart to at least partially restrain the first movable cart in the receiving position.

3. The system of claim 1, wherein the first movable cart includes a plurality of wheels that facilitate movement of the cart, and wherein the second movable cart is the same as the first movable cart.

4. The system of claim 3, wherein the first movable cart and the second movable cart each include an engagement portion, and wherein the vehicle includes a coupling portion that cooperates with the engagement portion of one of the first movable cart and the second movable cart to connect the vehicle and the selected one of the first movable cart and the second movable cart for movement.

5. The system of claim 4, wherein the vehicle connects to the second movable cart and moves the second movable cart from the staging position to the receiving position in response to a signal that is indicative of the first movable cart being full.

6. The system of claim 1, wherein the vehicle selectively disengages from the second movable cart when the cart is positioned in the receiving position, and wherein the vehicle is movable to the transfer position to engage the first movable cart to move the first movable cart to one of the plurality of loading points.

7. The system of claim 1, wherein the vehicle is an autonomous guided vehicle.

8. A method of sorting packages, the method comprising:
   positioning a first movable cart in a receiving position to receive packages from a first conveyor;
   positioning an empty second movable cart in a staging position;
   engaging the second movable cart with a vehicle to allow the vehicle to move the second movable cart into the receiving position while simultaneously abutting and displacing the first movable cart to a transfer position;
   disengaging the vehicle from the second movable cart;
   engaging the vehicle and the first movable cart to allow the vehicle to move the first movable cart to one of a plurality of loading points; and
   disengaging the vehicle from the first movable cart.

9. The method of claim 8, wherein the receiving position includes an indexing member that engages the first movable cart to at least partially restrain the first movable cart in the receiving position.

10. The method of claim 8, wherein the vehicle is an autonomous guided vehicle.

11. The method of claim 8, wherein the second movable cart includes an engagement portion and the vehicle includes a coupling portion, and wherein the coupling portion selectively engages the engagement portion to connect the second movable cart and the vehicle for movement.

12. The method of claim 11, wherein second movable cart directly contacts the first movable cart to displace the first movable cart from the receiving position in response to movement of the second movable cart and vehicle into the receiving position.

13. The method of claim 8, further comprising providing a signal to the vehicle, the signal indicating that the first movable cart is full, and wherein the vehicle engages the second movable cart in response to receipt of the signal.

* * * * *